United States Patent
Choi (10) Patent No.: US 12,288,429 B2
(45) Date of Patent: Apr. 29, 2025

(54) DATA MANAGEMENT SYSTEM AND OPERATION METHOD THEREOF

(71) Applicants: Hyundai Motor Company, Seoul (KR); Kia Corporation, Seoul (KR)

(72) Inventor: Byoung Il Choi, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 336 days.

(21) Appl. No.: 17/875,972

(22) Filed: Jul. 28, 2022

(65) Prior Publication Data

US 2023/0177893 A1    Jun. 8, 2023

(30) Foreign Application Priority Data

Dec. 2, 2021    (KR) .................. 10-2021-0171028

(51) Int. Cl.
G07C 5/08    (2006.01)
G06F 16/2455    (2019.01)
G06F 16/28    (2019.01)
G07C 5/10    (2006.01)

(52) U.S. Cl.
CPC ..... G07C 5/0808 (2013.01); G06F 16/24568 (2019.01); G06F 16/285 (2019.01); G07C 5/085 (2013.01); G07C 5/10 (2013.01)

(58) Field of Classification Search
CPC ............... G06F 16/215; G06F 16/285; G06F 16/24568; G07C 5/10; G07C 5/085; G07C 5/0808

USPC .......................................................... 702/183
See application file for complete search history.

(56) References Cited

U.S. PATENT DOCUMENTS 11,353,860  B2 *  6/2022  Nasu ..................... G06N 5/04
2020/0304891 A1 *  9/2020  Jo .......................... H04Q 9/00
2021/0284181 A1 *  9/2021  Song ..................... G07C 5/008

FOREIGN PATENT DOCUMENTS

KR    10-0731497 B1    6/2007

OTHER PUBLICATIONS

Kim et al., KR101988353 B1, "Industrial Field Production Management System Through Visualization and Analysis of Data Interlocked to Cyber Physical System", Date published: Sep. 30, 2019 (Year: 2019).*

* cited by examiner

Primary Examiner — John H Le
(74) Attorney, Agent, or Firm — Morgan, Lewis & Bockius LLP (57) ABSTRACT

A data management system and an operation method thereof are disclosed. The system includes: a data collecting unit configured to collect input data obtained by hardware; a database configured to store analysis reference data for analysis of collected input data and analysis result data; and an analysis unit configured to compare input data with analysis reference data to extract abnormal data, and classify the abnormal data so as to store the abnormal data as analysis result data in the database.

13 Claims, 6 Drawing Sheets

DATA MANAGEMENT SYSTEM AND OPERATION METHOD THEREOF

CROSS-REFERENCE TO RELATED APPLICATION(S)

This application is based on and claims priority under 35 U.S.C. 119 to Korean Patent Application No. 10-2021-0171028, filed on Dec. 2, 2021, in the Korean Intellectual Property Office, the disclosure of which is herein incorporated by reference in its entirety.

TECHNICAL FIELD

The present disclosure relates to a data management system and an operation method thereof, and more particularly, to a data management system and an operation method thereof in which, even if a fault code which is defined according to the contents of faults of numerous electronic control units (ECUs) mounted on a vehicle is not generated, control errors may be efficiently improved without omission, by determining a plurality of errors that deviate from analysis reference data, such as contents specified in development specifications, and labeling data diagnosed as errors, so as to prioritize the same for improvement.

BACKGROUND

Vehicles are equipped with numerous electronic control units (ECUs) to implement electrification, autonomous driving, and connectivity technologies that connect vehicles and users. Each ECU monitors whether an operation is performed normally, and defines a fault code according to the content of each fault if an operation is not performed normally, wherein a fault code is generated and stored in the ECU only when a condition of each fault is met, and the fault code is transmitted to diagnosis equipment in response to a request of the diagnosis equipment or is transmitted to a server wirelessly via a monitoring terminal mounted on a vehicle in a development stage or a monitoring terminal mounted on a vehicle after mass production with the consent of a customer.

However, conventionally, when no fault code is generated, or a fault code defined as a vehicle database in the development stage or after mass production does not exist, it is impossible to determine an abnormal operation of a vehicle. In addition, conventionally, even when a fault code is generated, an abnormal state of a vehicle cannot be diagnosed unless a controller stores the fault code or transmits the same to a server.

The descriptions provided as a background art are for the purpose of enhancing the understanding of the background of the present disclosure and merely correspond to technical information, which an inventor has possessed for deriving of embodiments of the present disclosure or has been acquired during a derivation procedure, and should not be taken as acknowledgement of correspondence to known technologies which have already been disclosed to those skilled in the art or to the general public prior to the filing of the application.

SUMMARY

The present disclosure has been proposed to solve such tasks and is to provide a data management system and an operation method thereof in which, even if a fault code which is defined according to the contents of faults of numerous electronic control units (ECUs) mounted on a vehicle is not generated, control errors may be efficiently improved without omission, by determining a plurality of errors that deviate from analysis reference data, such as contents specified in development specifications, and labeling data diagnosed as errors, so as to prioritize the same for improvement.

The present disclosure is not limited to the technical tasks as described above, and other technical tasks may be derived from the following description.

As a technical means for achieving the aforementioned technical tasks, a data management system according to the present disclosure includes: a data collecting unit configured to collect input data obtained by hardware; a database configured to store analysis reference data for analysis of collected input data and analysis result data; and an analysis unit configured to compare input data with analysis reference data to extract abnormal data, and classify the abnormal data so as to store the same as analysis result data in the database.

The input data may be at least one of use vehicle data collected by a vehicle used by a user, or development vehicle data collected by a development vehicle of a manufacturer.

The database may include: a first database configured to store the analysis reference data for analysis of the use vehicle data and the development vehicle data; and a second database configured to store the abnormal data as the analysis result data. The abnormal data may be extracted by comparing the use vehicle data and the development vehicle data with the analysis reference data and is classified as the analysis result data.

The analysis reference data may include at least one of normal data obtained by normal operating hardware or sensor data obtained by a sensor installed in the normal operating hardware.

The analysis reference data may include at least one of the normal data obtained by the normal operating hardware by virtually operating the normal operating hardware according to a preconfigured normal operation scenario, or the sensor data obtained by a sensor installed in the normal operating hardware by virtually operating the normal operating hardware according to the preconfigured normal operation scenario.

When the input data is continuous data, the analysis unit may extract the abnormal data by comparing at least one of a signal waveform, a signal magnitude, a signal width, or a signal period of the input data with that of the analysis reference data.

When the input data is discrete data, the analysis unit may extract the abnormal data by comparing at least one of a signal waveform or a signal result value of the input data with that of the analysis reference data.

The analysis result data may be obtained by classifying the abnormal data according to at least one classification criterion among a duration of the abnormal data, the number of pieces of the abnormal data, the number of types of hardware that produces the abnormal data, a sales waiting time of the hardware that produces the abnormal data, and a safety class of a controller configured to control the hardware that produces the abnormal data.

As an operation method of a data management system according to the present disclosure, an operation method of operating, by a processor, a data management system that manages data generated while performing hardware operations includes operations: comparing analysis reference data obtained by normal operating hardware with input data collected by comparison target hardware to determine whether the input data is abnormal data; and when the input data is determined to be the abnormal data, extracting abnormal diagnosis data including a duration and the number of occurrences of the abnormal data in the comparison target hardware, and labeling, based on the abnormal diagnosis data, an abnormal diagnosis priority for diagnosis on the input data.

The hardware may be a vehicle, and the input data may include at least one of use vehicle data of a vehicle used by a user, or development vehicle data obtained by collecting vehicle data of a development vehicle of a manufacturer.

A database includes: a first database configured to store the analysis reference data for analysis of the use vehicle data and the development vehicle data; and a second database configured to store the abnormal data as analysis result data, wherein the abnormal data is extracted by comparing the use vehicle data and the development vehicle data with the analysis reference data and is classified as the analysis result data.

In the determining of the abnormal data, when the input data is continuous data, the abnormal data may be extracted by comparing at least one of a signal waveform, a signal magnitude, a signal width, or a signal period of the input data with that of the analysis reference data.

In the determining of the abnormal data, when the input data is discrete data, the abnormal data may be extracted by comparing at least one of a signal waveform or a signal result value of the input data with that of the analysis reference data.

In the labeling of the abnormal diagnosis priority, analysis result data may be obtained by classifying the abnormal data according to at least one classification criterion among a duration and the number of occurrences of the abnormal data, the number of types of hardware that produces the abnormal data, a sales waiting time of the hardware that produces the abnormal data, and a safety class of a controller configured to control the hardware that produces the abnormal data.

As a technical means for achieving the aforementioned technical tasks, some embodiments of the present disclosure may provide one or more computer-readable recording media in which a program for performing the aforementioned method is recorded.

According to a data management system and an operation method thereof in the present disclosure, even if a fault code which is defined according to the contents of faults of numerous electronic control units (ECUs) mounted on a vehicle is not generated, control errors may be efficiently improved without omission, by determining a plurality of errors that deviate from analysis reference data, such as contents specified in development specifications, and labeling data diagnosed as errors, so as to prioritize the same for improvement.

The present disclosure is not limited to the aforementioned technical effects, and other technical effects may be derived from the following description.

DETAILED DESCRIPTION OF THE EXEMPLARY EMBODIMENTS

A specific structural or functional description of embodiments of the present disclosure set forth in the specification or application is given merely for the purpose of describing the embodiment according to the present disclosure. Therefore, the embodiments according to the present disclosure may be implemented in various forms, and the present disclosure should not be construed as being limited to the embodiments described in the specification or application.

To clearly describe the present disclosure, parts not associated with the description are omitted, and throughout the specification, the same or like reference numerals designate the same or like elements. Further, A singular expression may include a plural expression unless they are definitely different in a context.

In the following detailed description, such terms as "a first" and/or "a second" used for names of elements are intended to distinguish between elements having the same configuration, and the elements are not necessarily limited by the order thereof in the following description. For example, a first element may be named a second element and similarly a second element may be named a second element without departing from the scope of protection of the present disclosure.

the specification, when a part is referred to as "including" or "having" an element, this expression means that the corresponding part does not exclude other elements and may further include any other element unless specially mentioned otherwise. That is, in the specification, the expression "include" or "have" are intended to specify the existence of mentioned features, regions, numbers, steps, operations, elements, components, or combinations thereof, and should be construed as not precluding the possible existence or addition of one or more other features, regions, numbers, steps, operations, elements, components, or combination groups thereof.

Further, in describing embodiments set forth in the specification, a detailed description of known relevant technologies will be omitted when it is determined that the description may make the subject matter of the present disclosure obscure.

Finally, unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure.

Hereinafter, embodiments of the present disclosure will be described in detail with reference to the accompanying drawings.

Figure 1:
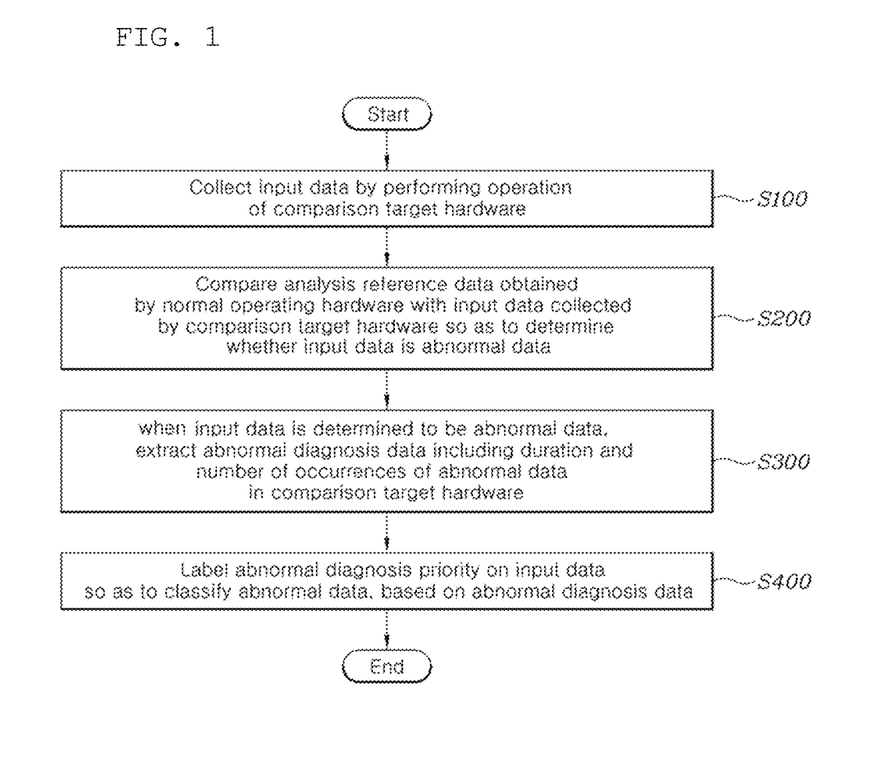
FIG. 1 is a flowchart of an operation method of a data management system according to an embodiment of the present disclosure.
Figure 2:
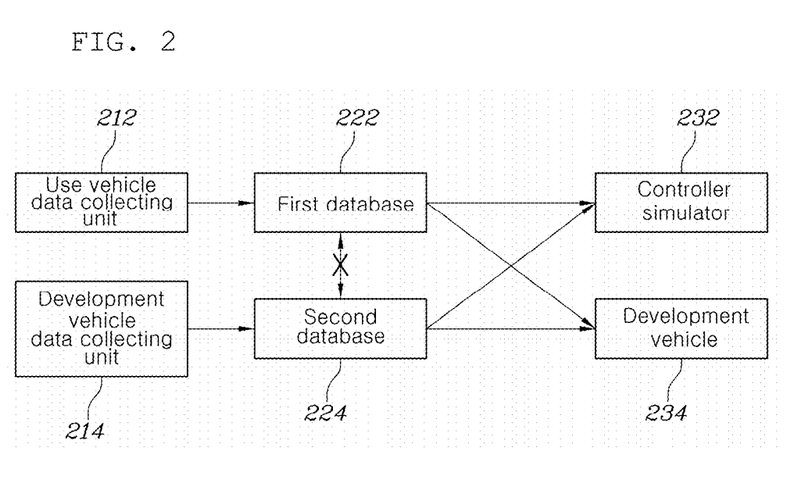
FIG. 2 is a block diagram of a data management system of the prior art.
Figure 3:
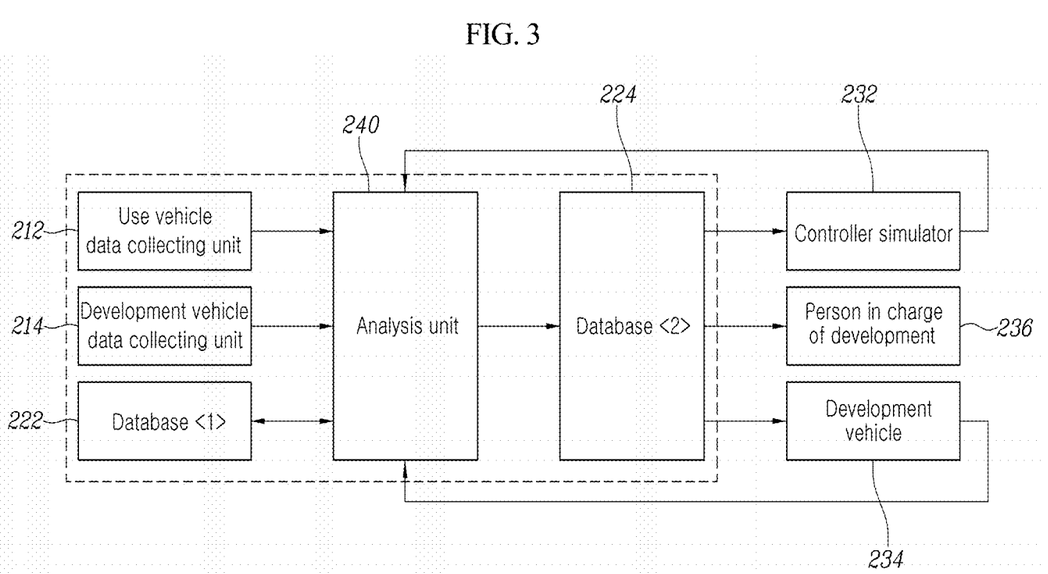
FIG. 3 is a block diagram of a data management system according to an embodiment of the present disclosure.
Figure 4:
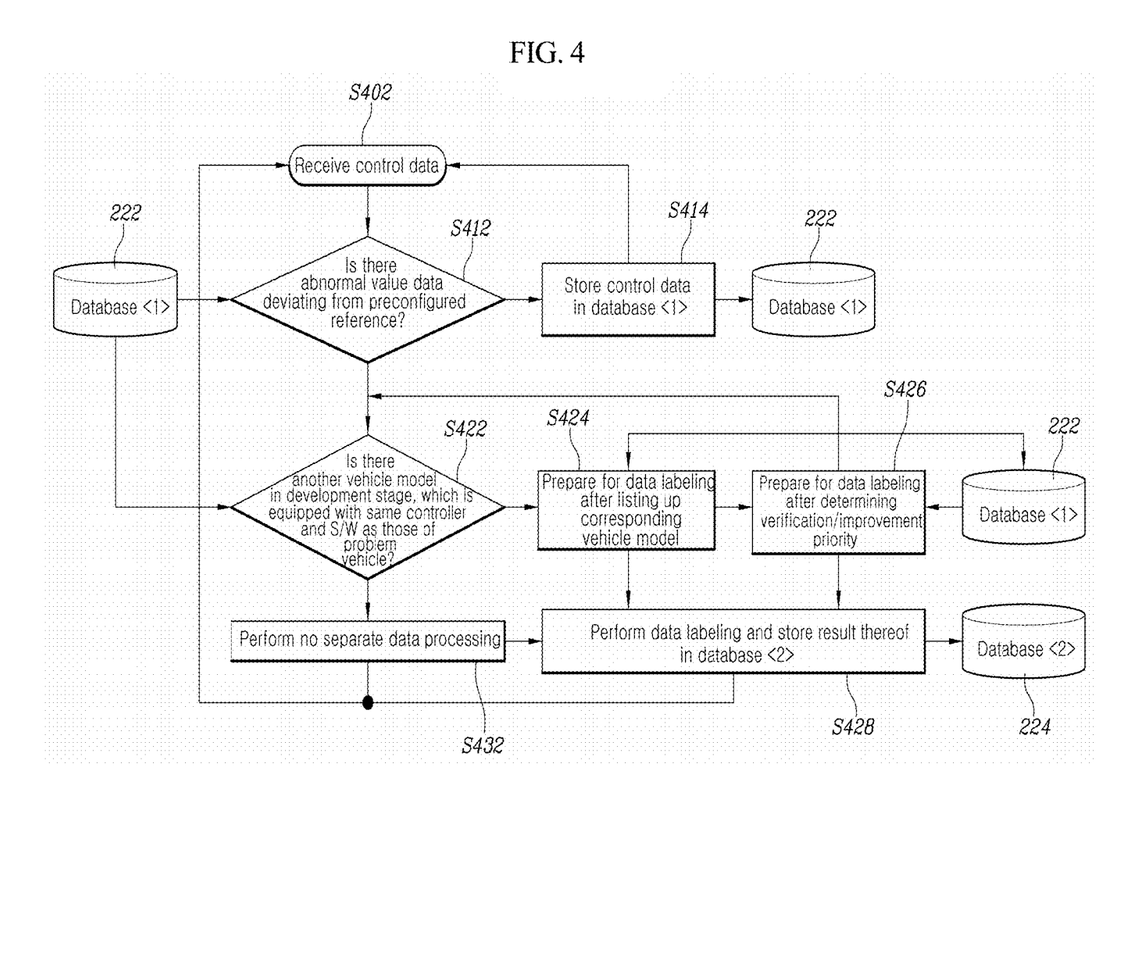
FIG. 4 is a flowchart of an operation method of the data management system according to an embodiment of the present disclosure.
Figure 5:
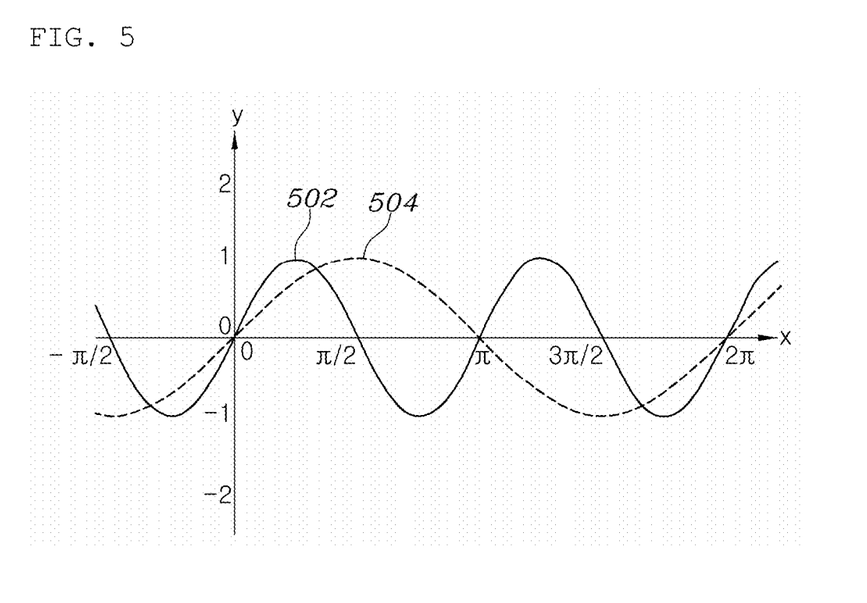
FIG. 5 is a diagram showing comparison of analysis reference data with input data for an analog signal in the operation method of the data management system according to an embodiment of the present disclosure.
Figure 6:
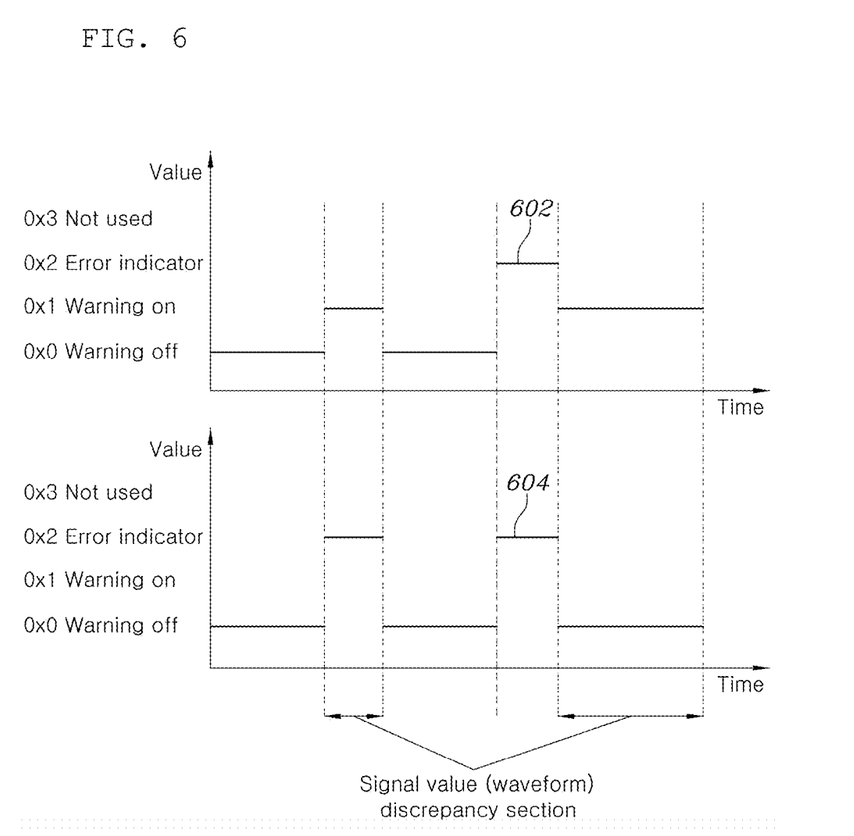
FIG. 6 is a diagram showing comparison of analysis reference data with input data for a digital signal in the operation method of the data management system according to an embodiment of the present disclosure.

FIG. 1 is a flowchart of an operation method of a data management system according to an embodiment of the present disclosure, FIG. 2 is a block diagram of a data management system of the prior art, FIG. 3 is a block diagram of a data management system according to an embodiment of the present disclosure, FIG. 4 is a flowchart of an operation method of the data management system according to an embodiment of the present disclosure, FIG. 5 is a diagram showing comparison of analysis reference data with input data for an analog signal in the operation method of the data management system according to an embodiment of the present disclosure, and FIG. 6 is a diagram showing comparison of analysis reference data with input data for a digital signal in the operation method of the data management system according to an embodiment of the present disclosure.

FIG. 1 is a flowchart of an operation method of a data management system according to an embodiment of the present disclosure. The operation method of a data management system according to an embodiment of the present disclosure is an operation method of operating, by a processor, a data management system that manages data generated while performing operations of hardware, the operation method including operations in which: the processor compares analysis reference data obtained by normal operating hardware with input data collected in S100 by comparison target hardware, so as to determine in S200 whether the input data is abnormal data; and if the input data is determined to be abnormal data, the processor extracts in S300 abnormal diagnosis data including a duration and the number of occurrences of the abnormal data in the comparison target hardware, and labels in S400 an abnormal diagnosis priority required to be diagnosed on the input data, based on the abnormal diagnosis data.

In other words, the data management system according to an embodiment of the present disclosure extracts and labels the abnormal diagnosis data in order to efficiently diagnose input data obtained by a controller, etc. by operating hardware.

In the data management system according to an embodiment of the present disclosure, hardware may be a vehicle, and the input data may include at least one of use vehicle data of a vehicle used by a user, which has been sold and is being used, or development vehicle data obtained by collecting vehicle data of a development vehicle of a manufacturer, which is under development. The hardware exemplified in the present disclosure includes, but is not limited to, vehicles, micro electric vehicles, electric drones, electric kick boards, electric wheels, electric bicycles, and other mobilities.

FIG. 2 is a block diagram of a data management system of the prior art. Vehicles include a use vehicle which has been sold and is in use, or a development vehicle which is under development before being sold. As illustrated in FIG. 2, a data management system of the prior art includes a use vehicle data collecting unit 212 and a development vehicle data collecting unit 214 which collect data obtained from each vehicle. In the data management system of the prior art, respective pieces of data are not integrated, but are divided into a first database 222 and a second database 224 so as to be managed/added/deleted/updated. Accordingly, when the data management system of the prior art is applied to a development vehicle 234, i.e., actual hardware, or a controller simulator 232 which detects, by operation via a virtual operation scenario, whether a controller controlling a hardware operation is abnormal, the data may not be organically linked and may be used sporadically.

In the data management system of the prior art, an evaluator manually evaluates a fault of the controller that controls hardware, via fault codes included in the first database 222 and the second database 224. Accordingly, if a fault code is not generated despite a condition/situation where a fault code should be generated, or a fault code is not stored in the controller, there may be a case where no transmission is performed to a server. In addition, a level difference occurs according to the experience, effort, and will of an evaluator, and thus fault verification may be insufficient. Accordingly, the data management system according to an embodiment of the present disclosure improves a hardware control quality by automation of organic analysis and labeling.

FIG. 3 is a block diagram of a data management system according to an embodiment of the present disclosure. The data management system according to an embodiment of the present disclosure includes: data collecting units (data collecting modules) 212 and 214 configured to collect input data obtained by hardware; databases 222 and 224 configured to store analysis reference data for analysis of collected input data and analysis result data that is an analysis result of the input data; and an analysis unit (an analysis module) 240 configured to compare input data with analysis reference data to extract abnormal data, and classify the abnormal data so as to store the same as analysis result data in the database.

As illustrated in FIG. 3, in the data management system according to another embodiment of the present disclosure, the data collecting unit may be at least one of the use vehicle data collecting unit 212 by which a vehicle used by a user, which has been sold and is being used, collects data, or the development vehicle data collecting unit 214 by which a development vehicle of a manufacturer, which is under development, collects data.

As illustrated in FIG. 3, in the data management system according to another embodiment of the present disclosure, the database may include: the first database 222 configured to store analysis reference data for analysis of use vehicle data and development vehicle data; and the second database 224 configured to store abnormal data as analysis result data, wherein the abnormal data is extracted by comparing the use vehicle data and the development vehicle data with the analysis reference data and is classified as the analysis result data.

The second database 224 enables labeling and evaluation by a person 236, i.e., an evaluator, in charge of development, and is provided to the controller simulator 232 or the development vehicle 234 so as to be evaluated.

FIG. 4 is a flowchart of an operation method of the data management system according to an embodiment of the present disclosure. As illustrated in FIG. 4, analysis reference data included in the first database 222 is received in S402, the presence of abnormal data is compared and determined in S412, and then the first database is updated in S414. In the operation method of the data management system according to another embodiment of the present disclosure, whether there exists a development vehicle with the same specification as that of a use vehicle is searched in the first database in S422, data labeling is prepared in S424 by listing up a corresponding vehicle model, and a classification score is given according to classification criteria, thereby determining a priority in S426. A data result labeled with the priority is stored in the second database in S428.

Here, analysis result data may be obtained by classifying the abnormal data according to at least one classification criterion among a duration of abnormal data, the number of pieces of the abnormal data, the number of types of hardware that produces the abnormal data, a sales waiting time of the hardware that produces the abnormal data, and a safety class of the controller configured to control the hardware that produces the abnormal data. An example of the priority given accordingly is shown in Table 1 below.

TABLE 1

|  | Duration of abnormal value | Number of previous occurrences | Number of vehicle models with the same specifications | Remaining period of vehicle model with the most imminent mass production time from among vehicle models with the same specifications | Controller safety class |
|---|---|---|---|---|---|
| Class S | 200 ms | 5 | 3 | within 3 months | C3 |
| Class A | 100 ms | 3 | 2 | within 5 months | C2 |
| Class B | 50 ms | 1 | 1 or none | within 7 months | C1 |

FIG. 5 is a diagram showing comparison of analysis reference data with input data for an analog signal in the operation method of the data management system according to an embodiment of the present disclosure. In the data management system according to an embodiment of the present disclosure, if input data 502 is continuous data, the analysis unit may compare at least one of a signal waveform, a signal magnitude, a signal width, or a signal period of the input data with that of analysis reference data 504, so as to extract abnormal data. As illustrated in FIG. 5, the input data 502 may be extracted and classified as abnormal data according to a comparison result.

FIG. 6 is a diagram showing comparison of analysis reference data with input data for a digital signal in the operation method of the data management system according to an embodiment of the present disclosure. In the data management system according to an embodiment of the present disclosure, if input data 602 is discrete data, the analysis unit may compare at least one of a signal waveform or a signal result value of the input data with that of analysis reference data 604, so as to extract abnormal data. As illustrated in FIG. 6, the input data 602 may be extracted and classified as abnormal data according to a comparison result.

As described above, according to the data management system and the operation method thereof in the present disclosure, even if a fault code which is defined according to the contents of faults of numerous electronic control units (ECUs) mounted on a vehicle is not generated, a plurality of errors that deviate from analysis reference data, such as contents specified in development specifications, may be determined.

In addition, control errors may be efficiently improved without omission, by labeling data diagnosed as errors and prioritizing the same for improvement.

The aforementioned device may be implemented as a hardware component, a software component, and/or a combination of a hardware component and a software component.

For example, a device may be implemented using one or more general purpose or special purpose computers, such as a processor, a controller, an arithmetic logic unit (ALU), a digital signal processor, a microcomputer, a field programmable gate array (FPGA), a programmable logic unit (PLU), a microprocessor, or any other device capable of executing and responding to instructions.

A processor may execute an operating system (OS) and one or more software applications executed on the operating system.

The processor may access, store, manipulate, process, and generate data in response to execution of software.

The processor may include multiple processing elements and/or multiple types of processing elements. For example, the processor may include multiple or a single processor and a single controller. Other processing configurations, such as parallel processors, are also possible.

The aforementioned software may include a computer program, a code, an instruction, or a combination of one or more thereof, and may configure a processing device to operate as desired or may independently or collectively instruct the processing device. In order to be interpreted by a processing device or to provide instructions or data to the processing device, software and/or data may be permanently or temporarily embodied in any type of machine, component, physical device, virtual equipment, computer storage medium or device, or transmitted signal wave. Software may be distributed on computing devices connected over a network so as to be stored or executed in a distributed manner. Software and data may be stored in one or more computer-readable recording media.

Terms such as "unit" used in the aforementioned embodiments may be implemented individually or in combination of software, such as a task, a class, a subroutine, a process, an object, an execution thread, a program, and a program-based AI accelerator which are executed in a predetermined area on a memory, or individually or in combination of hardware, such as a graphic processing unit (GPU), a central processing unit (CPU), a field programmable gate array (FPGA) or an application-specific integrated circuit (ASIC), a digital signal processor (DSP), vision processing units (VPC), a neuromorphic chip (neuromorphic IC), and a hardware-based AI accelerator.

In addition, "unit" in the aforementioned embodiments may include a combination of software and hardware, either individually or in combination thereof. In addition, "unit" in the embodiments may be included in a computer-readable storage medium. In addition, "unit" in the embodiments may be partially separated and distributed in multiple pieces of hardware or software or in a combination thereof. In this case, data processing of "unit" in the embodiments may be distributed, centralized, or accelerated, such as cloud computing, edge computing, or AI edge computing. In one example, "unit" in the aforementioned embodiments may be further implemented as a processor to perform the respective operations when executing the software stored in the computer-readable storage medium.

Hereinabove, the present disclosure has been described on the basis of various exemplary embodiments. Those skilled in the art to which the present disclosure belongs will understand that the present disclosure may be implemented in a modified form without departing from the basic characteristics of the present disclosure.

In other words, since the embodiments according to the present disclosure may have various modifications applied thereto and may have various forms, specific embodiments are illustrated in the drawings and described in detail in the present specification or application. However, this is not intended to limit the embodiments according to the concept of the present disclosure to a specific disclosed form, and it should be understood that the present disclosure includes all modifications, equivalents, or alternatives falling within the spirit and technical scope of the embodiments.

Therefore, the disclosed embodiments should be considered in illustrative aspects rather than limiting aspects. It should be understood that the scope of the present disclosure falls within the appended claims, not in the detailed description, and all changes within the equivalent range are included in the present disclosure.

What is claimed is:

1. A data management system comprising:
   a data collecting unit configured to collect input data obtained by a vehicle while performing operations of the vehicle;
   a database configured to store analysis reference data for analysis of collected input data;
   an analysis unit configured to compare the input data with analysis reference data to extract abnormal data from the input data, and classify the abnormal data so as to store the abnormal data as analysis result data of the vehicle in the database; and
   a controller simulator, which detects whether a controller controlling the operations of the vehicle is abnormal without a fault code, organically linked to the input data, and
   wherein the analysis result data is obtained by classifying the abnormal data according to at least one classification criterion among a duration of the abnormal data, the number of pieces of the abnormal data, the number of types of vehicle that produces the abnormal data, a sales waiting time of the vehicle that produces the abnormal data, and a safety class of the controller configured to control the vehicle that produces the abnormal data.

2. The system of claim 1, wherein the input data is at least one of use vehicle data collected by a vehicle used by a user, or development vehicle data collected by a development vehicle of a manufacturer.

3. The system of claim 2, wherein the database comprises:
   a first database configured to store the analysis reference data for analysis of the use vehicle data and the development vehicle data; and
   a second database configured to store the abnormal data as the analysis result data, wherein the abnormal data is extracted by comparing the use vehicle data and the development vehicle data with the analysis reference data and is classified as the analysis result data.

4. The system of claim 1, wherein the analysis reference data comprises at least one of normal data obtained by normal operating vehicle or sensor data obtained by a sensor installed in the normal operating vehicle.

5. The system of claim 4, wherein the analysis reference data comprises at least one of the normal data obtained by the normal operating vehicle by virtually operating the normal operating vehicle according to a preconfigured normal operation scenario, or the sensor data obtained by the sensor installed in the normal operating vehicle by virtually operating the normal operating vehicle according to the preconfigured normal operation scenario.

6. The system of claim 1, wherein, when the input data is continuous data, the analysis unit extracts the abnormal data by comparing at least one of a signal waveform, a signal magnitude, a signal width, or a signal period of the input data with that of the analysis reference data.

7. The system of claim 1, wherein, when the input data is discrete data, the analysis unit extracts the abnormal data by comparing at least one of a signal waveform or a signal result value of the input data with that of the analysis reference data.

8. The system of claim 1, further comprising a processor configured to label, based on the abnormal diagnosis data, an abnormal diagnosis priority for diagnosis on the input data.

9. An operation method of operating, by a processor, a data management system configured to manage data generated while performing vehicle operations, the operation method comprising:
   comparing analysis reference data obtained by normal operating vehicle with input data collected by comparison target vehicle to determine whether the input data is abnormal data; and
   when the input data is determined to be the abnormal data, extracting, from the input data, abnormal diagnosis data comprising a duration and the number of occurrences of the abnormal data in the comparison target vehicle, and labeling, based on the abnormal diagnosis data, an abnormal diagnosis priority for diagnosis on the input data,
   wherein a controller simulator, which detects whether a controller controlling the vehicle operations is abnormal without a fault code, is used to be organically linked to the input data; and
   wherein, in the labeling of the abnormal diagnosis priority, analysis result data is obtained by classifying the abnormal data according to at least one classification criterion among a duration and the number of occurrences of the abnormal data, the number of types of vehicle that produces the abnormal data, a sales waiting time of the vehicle that produces the abnormal data, and a safety class of the controller configured to control the vehicle that produces the abnormal data.

10. The operation method of claim 9, wherein
    the input data comprises at least one of use vehicle data of a vehicle used by a user, or development vehicle data obtained by collecting vehicle data of a development vehicle of a manufacturer.

11. The operation method of claim 10, wherein a database comprises:
    a first database configured to store the analysis reference data for analysis of the use vehicle data and the development vehicle data; and
    a second database configured to store the abnormal data as analysis result data, wherein the abnormal data is extracted by comparing the use vehicle data and the development vehicle data with the analysis reference data and is classified as the analysis result data.

12. The operation method of claim 9, wherein the determining of the abnormal data comprises, when the input data is continuous data, comparing at least one of a signal waveform, a signal magnitude, a signal width, or a signal period of the input data with that of the analysis reference data so as to extract the abnormal data.

13. The operation method of claim 9, wherein the determining of the abnormal data comprises, when the input data is discrete data, comparing at least one of a signal waveform or a signal result value of the input data with that of the analysis reference data so as to extract the abnormal data.

* * * * *